United States Patent [19]
Stenton

[11] Patent Number: 5,684,593
[45] Date of Patent: Nov. 4, 1997

[54] EASY TO ALIGN INTERFEROMETRIC REFERENCE REFLECTORS

[75] Inventor: Conrad Stenton, Midland, Canada

[73] Assignee: Hughes Electronics, Los Angeles, Calif.

[21] Appl. No.: 638,005

[22] Filed: Apr. 25, 1996

[51] Int. Cl.⁶ ................................................ G01B 9/02
[52] U.S. Cl. ......................... 356/360; 356/345; 356/400
[58] Field of Search .............................. 356/345, 359, 356/360, 399, 401, 400

[56] References Cited

U.S. PATENT DOCUMENTS 4,085,329  4/1978  McCoy et al. ........................ 250/491
5,467,193  11/1995  Laewen et al. ....................... 356/399
5,563,706  10/1996  Shibuya et al. ....................... 356/359

*Primary Examiner*—Frank G. Font
*Assistant Examiner*—Robert Kim
*Attorney, Agent, or Firm*—Gordon R. Lindeen, III; Michael W. Sales; Wanda K. Denson-Low

[57] ABSTRACT

A reference reflector alignment aid (26) is provided including an alignment indicator (28). The alignment aid (26) is secured to a reference reflector (30) such that the alignment indicator (28) is located essentially at the optical center of curvature (32) of the reference reflector (30). The alignment aid (26) and reference reflector (30) are movable as a unit to position the optical center of curvature (32) coincident to the focal point (24) of an element or optical system to be tested (20).

14 Claims, 3 Drawing Sheets

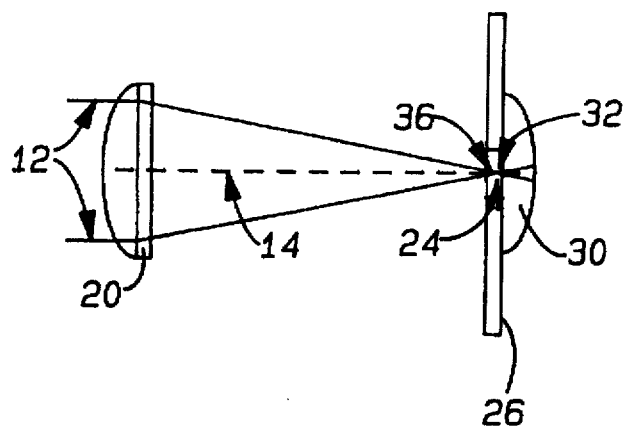
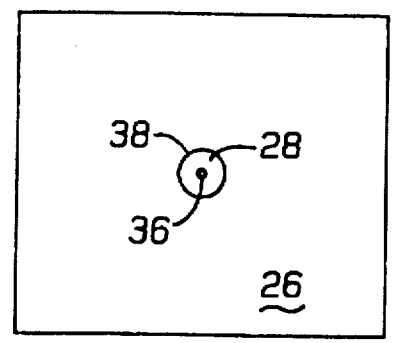
Fig-7A          Fig-7B
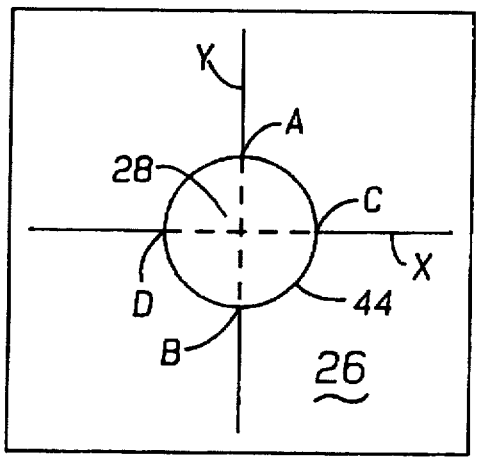
Fig-8

EASY TO ALIGN INTERFEROMETRIC REFERENCE REFLECTORS

BACKGROUND OF THE INVENTION

1. Technical Field

This invention generally relates to optical systems for interferometric testing. More particularly, the present invention relates to an apparatus for aligning a reference reflector.

2. Discussion

As is generally known in the art of interferometry, there exists a very small acceptance angle wherein an image of the element or optical system to be tested can be captured for testing by an interferometer. Therefore, it is essential that the optical center of curvature of a reference reflector used in the testing procedure be positioned coincident with the focal point of the element or optical system to be tested. In this way, radiation returned from the reference reflector is reflected back to the interferometer wherein critical alignment may be performed. However, known interferometric testing systems do not possess means for accurately and conveniently locating the focal point of the element or optical system to be tested or means for positioning the reference reflector thereto. Moreover, such systems do not possess means for readily communicating to the optician the degree to which a reference reflector is misaligned.

Previously, alignment of the optical center of curvature of the reference reflector with the focal point of an element or optical system to be tested required a large degree of optician skill and experience. Conventional alignment of the reference reflector is accomplished by trial and error using pin holes, cards and other clues. These aids are not secured to the reference reflector and generally do not provide the optician with a large quantity of system feedback. Therefore, the optician must coordinate movement of two devices and rely on experience to quickly find the focal point of the element or optical system to be tested and align the optical center of curvature of the reference reflector thereto.

SUMMARY OF THE INVENTION

The above and other objects are provided by incorporating an alignment aid into an optical system for interferometric testing using a reference reflector. The alignment aid is secured to the reference reflector in a manner such that an alignment indicator associated with the alignment aid is located essentially at the optical center of curvature of the reference reflector. The alignment aid and reference reflector are movable as a unit to position the optical center of curvature of the reference reflector coincident with the focal point of the element or optical system to be tested.

BRIEF DESCRIPTION OF THE DRAWINGS

FIG. 5b is a front schematic view of an alignment aid including an image thereon in the misaligned condition of FIG. 5a.

FIG. 6b is a front schematic view of an alignment aid including an image thereon in the misaligned condition of FIG. 6a.

FIG. 7a is a top schematic view of an element to be tested, an alignment aid and a reference reflector after focusing an image onto the alignment aid and positioning the image to the alignment indicator according to the present invention.

FIG. 7b is a front schematic view of an alignment aid including an image thereon in the properly aligned condition of FIG. 7a.

FIG. 8 is a front schematic view of an alignment aid including a reference reflector thereon according to the present invention.

DETAILED DESCRIPTION OF THE PREFERRED EMBODIMENTS

Figure 1:
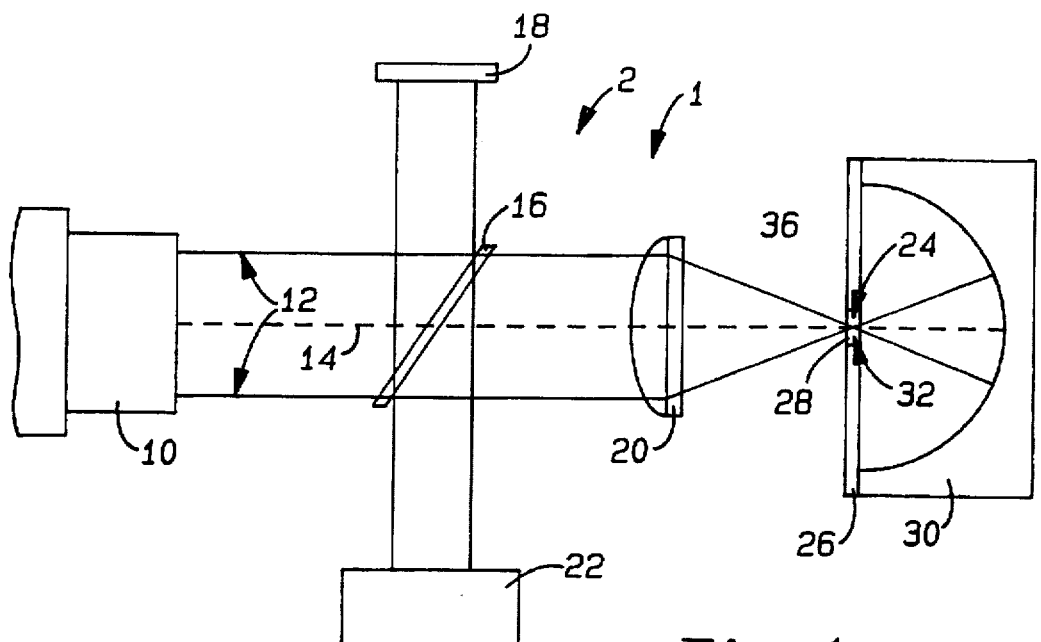
FIG. 1 is a top schematic view of an optical system for interferometric testing including a reference reflector having an alignment aid secured thereto according to the present invention.

In FIG. 1, an optical system for interferometric testing implementing the present invention is shown generally at 1. An interferometer for capturing, critically aligning and testing an image 36 is generally indicated at 2. As is known in the art of interferometry, to obtain proper interference information it is essential to position the optical center of curvature 32 of the reference reflector 30 coincident with the focal point 24 of the element or optical system to be tested, e.g. lens 20. In this way, the reference reflector 30 returns the radiation 12 to the interferometer 2 such that it may be captured for critical alignment and testing. The present invention provides a means for quickly and easily locating the focal point 24 of an element or optical system to be tested 20 and positioning the optical center of curvature 32 of the reflector 30 therewith. Furthermore, the complexity, time and skill required to achieve alignment are reduced.

Still referring to FIG. 1, a light source 10, such as a laser, projects a beam of radiation 12 along an optical axis 14 to a beam splitter 16. As is known in the art, a lens or other elements may be inserted between the light source 10 and the beam splitter 16 to ensure that the rays of radiation 12 are parallel. It should be noted that while the present invention is shown implemented in a Twyman-Green interferometer, it is suitable for use in any system requiring alignment of a reference reflector. The beam splitter 16 reflects part of the radiation 12 to the reflector 18 and permits part to pass on to an element or optical system to be tested, in this case, lens 20. It should be noted that while lens 20 is shown, other elements or complete optical systems could be substituted therefore, such as but not limited to, other lenses, prisms, or optical flats. The reflector 18 reflects the radiation 12 back to the beam splitter 16 and on to the interference viewing screen or detector 22.

The radiation 12 from the light source 10 which passes through the beam splitter 16 is converged by the lens 20 to a focal point 24. An alignment aid 26 having an alignment indicator 28 associated therewith is secured to a reference reflector 30 in a manner such that the alignment indicator 28 is located at the optical center of curvature 32 of the reference reflector 30. As is described in greater detail below, the alignment indicator 28, and therefore the optical center of curvature 32, are shown in FIG. 1 to be positioned coincident with the focal point 24 of the lens 20.

The reference reflector 30 reflects the radiation 12 back through the lens 20 and onto the beam splitter 16. As is known, a compensator (not shown) may be inserted between the reference reflector 30 and the beam splitter 16 to ensure symmetry. The beam splitter 16 partly reflects the radiation 12 to the detector 22. Thus, the radiation reflected from the reflector 18 interferes with the radiation reflected from the reference reflector 30 and the fringe pattern thereof is viewable on the detector 22. In this way, any deformities of the lens 20 are displayed in the fringe pattern and an optician may then address the deformities accordingly, as by further polishing.

Figure 2:
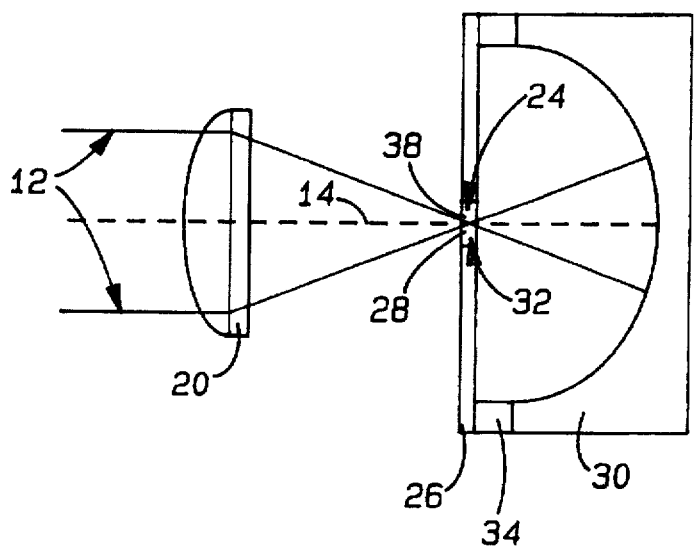
FIG. 2 is a top schematic view of an element to be tested and a reference reflector having an alignment aid secured thereto according to the present invention.

Turning to FIG. 2, the lens 20 converges radiation 12 to a focal point 24. The radiation passes through an opening 38 comprising the alignment indicator 28, strikes the reference reflector 30 and is returned to the interferometer 2 for critical alignment and testing.

In the embodiment shown, the alignment aid 26 is secured to a concave reference reflector 30. It should be noted that the alignment aid 26 of the present invention can also be used in conjunction with reference reflectors of varying geometries including concave, convex and flat configurations. However, it has been determined that while the present invention performs adequately with any of the above mentioned geometries, it is particularly well suited for use in conjunction with concave reflectors.

In the embodiment shown in FIG. 2, the alignment aid 26 is secured to a spacer 34 which is secured to the reference reflector 30. However, as shown in FIG. 1, the alignment aid 26 may also be secured directly to the reference reflector 30. In either case, the alignment aid 26 is secured to the reference reflector 30 in a manner so that the alignment indicator 28 is located essentially at the optical center of curvature 32 of reflector 30.

It is preferable that the alignment aid 26 be secured to the reference reflector 30 concentrically so that the alignment indicator 28 is approximately at the center of the alignment aid 26. However, this preference is secondary to positioning the alignment indicator 28 at the optical center of curvature 32. Furthermore, while a number of satisfactory means for securing the alignment aid 26 to the reference reflector 30 are available, in the preferred embodiment optical cement is used. In this way, the alignment aid 26 is rigidly fixed to the reference reflector 30 but prior to the cement setting up, the alignment aid 26 is easily positionable to the desired location on the reference reflector 30.

Preferably, the alignment aid 26 is placed on the reference reflector 30 and oriented to position the alignment indicator 28 essentially at the optical center of curvature 32 of the reference reflector 30. As noted above, this may require a spacer 34 to be used depending on the configuration of the reference reflector 30.

Figure 3:
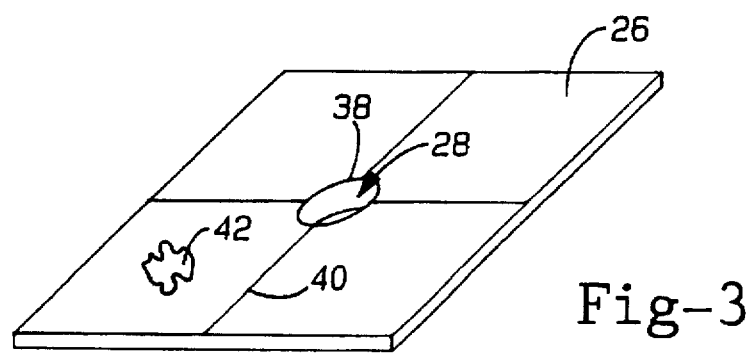
FIG. 3 is a perspective view of an alignment aid including an alignment indicator according to the present invention.

Referring also now to FIG. 3, the alignment aid 26 is shown including an alignment indicator 28. The alignment aid 26 of the present invention is generally a screen or diaphragm including an alignment indicator 28 associated therewith. The particular material used to form the alignment aid 26 of the present invention is not critical so long as it supports the alignment indicator 28 adequately, is securable to the reference reflector 30 and affords ample viewing of the image 36 (to be described below). Vellum, glass and plastic have all been used to form the alignment aid 26 with satisfactory results.

Cross-hairs 40 are provided on the alignment aid 26 and fluorescent material 42 is included across the surface of the alignment aid 26. In the preferred embodiment, the alignment indicator 28 includes an opening or aperture 38 formed through the alignment aid 26. Alternatively, the alignment indicator 28 may comprise a reference mark, an aperture, or fluorescent material or any combination thereof.

If a reference mark is employed, it may comprise virtually any indicia such as an ink spot or cross hairs. Also, if fluorescent material is included, it may be responsive to radiation of any desired wavelength. However, material which is responsive to infrared or ultraviolet radiation or a mixture thereof has been found to be particularly useful. Furthermore, an alignment indicator 28 comprising an aperture may possess reflective, specular or diffusive characteristics.

It is preferable that the alignment indicator 28 comprise an opening 38. This is particularly true for reference reflectors having a concave configuration as the opening 38 permits the alignment aid 26 to remain secured to the reference reflector 30 during testing of the lens 20. In contrast, an alignment aid 26 without an opening therein may require removal from the reference reflector 30 to enable the radiation 12 to be returned from the reference reflector 30. Whether using an aperture or not, cross-hairs, fluorescent material or other features assisting alignment, such as a grid, may be incorporated into the alignment aid 26.

Figure 4:
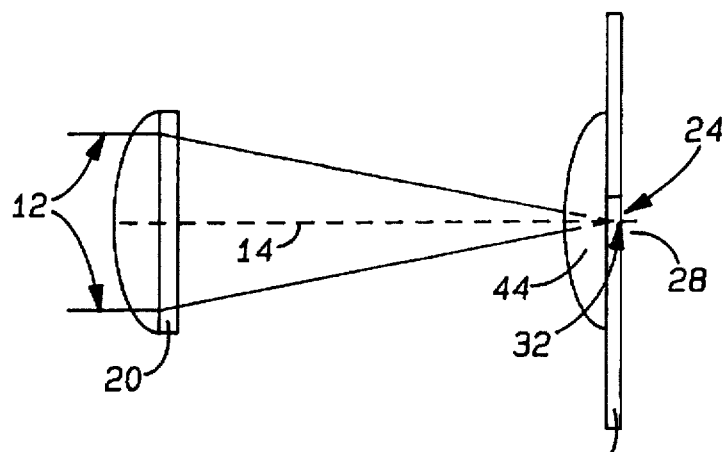
FIG. 4 is a top schematic view of an element to be tested and a reference reflector having an alignment aid secured thereto according to the present invention.

Referring now to FIG. 4, the alignment aid 26 is secured to a convex reference reflector 44 in a manner such that the alignment indicator 28 is located at the optical center of curvature 32. As with previous embodiments, the lens 20 converges the radiation 12 towards a focal point 24 and the reference reflector 44 reflects the radiation 12. As shown, the center of curvature 32 is coincident with the focal point 24.

The operation of the present invention will now be described in greater detail. Although the operation is described with reference to the concave reflector 30, any reference reflector could substitute therefore including the convex reflector 44. Initially, the alignment aid 26 and reference reflector 30 are moved as a unit towards the optical axis 14 to position the image 36 on the alignment aid 26. In FIGS. 5, 6 and 7, various stages of alignment are shown as the alignment aid 26 and reference reflector 30 are moved as a unit axially and radially with respect to the optical axis 14. In this way, the optical center of curvature 32 is positionable to the focal point 24 of the lens 20.

Figure 5A:
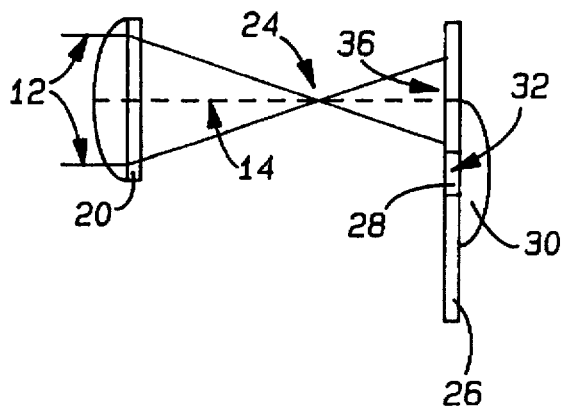
FIG. 5a is a top schematic view of an element to be tested, an alignment aid and a reference reflector prior to focusing an image onto the alignment aid and prior to positioning the image to the alignment indicator according to the present invention.

In FIG. 5a, the lens 20 converges the radiation 12 to the focal point 24. The radiation 12 diverges again and strikes the alignment aid 26 forming an image 36 thereon. Thus, the alignment aid 26 is serving as a retro target for the radiation 12 focused by the element or optical system to be tested, e.g. lens 20.

Figure 5B:
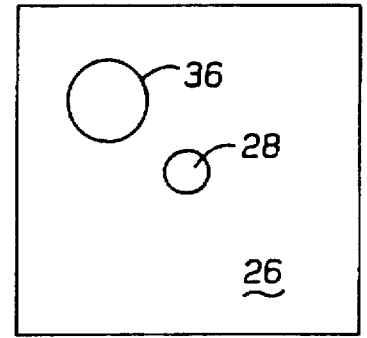

As shown in FIGS. 5a and 5b, the optical center of curvature 32 of the reference reflector 30 is not properly aligned with the focal point 24. As shown in FIG. 5a, the image 36 is out of focus and displaced from the alignment indicator 28. In FIG. 5b, this misaligned condition is observable on the alignment aid 26 by noting the relatively large image 36 displaced from the alignment indicator 28.

Figure 6A:
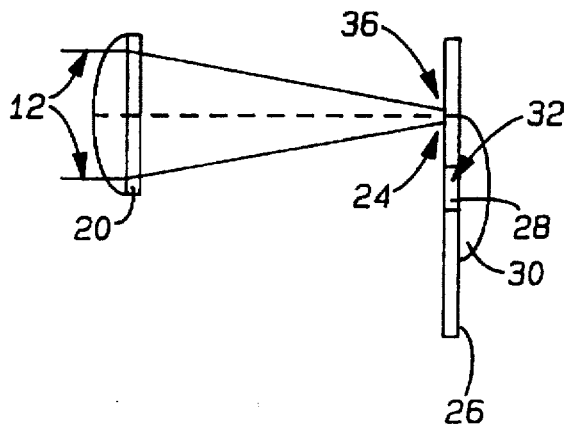
FIG. 6a is a top schematic view of an element to be tested, an alignment aid and a reference reflector after focusing an image onto the alignment aid but prior to positioning the image to the alignment indicator according to the present invention.

In FIG. 6a, the alignment aid 26 and the reference reflector 30 have been moved as a unit axially along the optical axis 14 to focus the image 36 on the alignment aid 26. Focusing is observable on the alignment aid 26 by noting the size of the image 36 changing. As the size of the image 36 reduces, it becomes more focused. Contrawise, as the size of the image 36 enlarges, it becomes less focused. Therefore, when the size of the image 36 is minimized, the image 36 is properly focused.

It should be noted that proper focusing of the image 36 is achieved by positioning the alignment aid 26 along the optical axis 14 at the focal point 24. Thus, by moving the alignment aid 26 and observing the size of the image 36, the alignment aid 26 may be placed at the focal point 24.

Figure 6B:
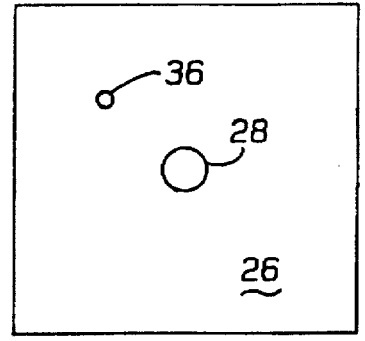

Thus, although the image 36 in FIGS. 6a and 6b is focused on the alignment aid 26, it remains displaced from the alignment indicator 28. As shown in FIG. 6b, the misaligned but focused image 36 is observable on the alignment aid 26 by noting the relatively small image 36 displaced from the alignment indicator 28.

Referring now to FIGS. 7a and 7b, the alignment aid 26 and reference reflector 30 have been moved as a unit radially with respect to the optical axis 14 to position the image 36 at the alignment indicator 28. If the alignment indicator 28 does not comprise an aperture 38, the properly aligned condition is observable on the alignment aid 26 by noting the relatively small size of the image 36 on the alignment indicator 28.

Also, while positioning the image 36, the size of the image 36 is observed to ensure that it is focused after radial movement is complete. Accordingly, minor axial movements of the alignment aid 26 and reference reflector 30 as a unit may be required.

As noted above, an alignment indicator 28 comprising an opening 38 does not permit the image 36 to be visible on the alignment indicator 28 when properly aligned. This is due to the radiation 12 passing through the opening 38. However, proper alignment is easily achieved by noting the position of the image 36 along the periphery of the opening 38 and moving the alignment aid 26 and reference reflector 30 as a unit to position the focused image 36 such that the radiation 12 passes through the opening 38.

Turning now to FIGS. 4 and 8, some convex reference reflectors 44 may not permit the image 36 to be viewed when it is positioned to the alignment indicator 28. This may be caused, for example, by the reference reflector 44 being opaque and therefore not permitting observation of the alignment indicator 28 located behind it. However, by noting the position of the image 36 along the edge of the reference reflector 44 during positioning, alignment is achieved.

In FIG. 8, four points along the periphery of the reference reflector 44 are designated A, B, C and D. It should be noted that although points A, B, C and D have been selected for this description, any points along the periphery of the reference reflector 44 would suffice. To achieve proper positioning of the image 36, the alignment aid 26 and reference reflector 44 are moved radially as a unit to maneuver the image 36 towards the reference reflector 44. For example, the movement may be in a direction along the Y axis. Movement of the alignment aid 26 and reference reflector 44 as a unit is continued until the image 36 is positioned at any point A, B, C or D. For clarity of description, the subsequent alignment steps will be described as though the image 36 first contacted the point A, although any point along the periphery of the reference reflector 44 could substitute therefore.

After positioning the image 36 to point A, radial movement of the alignment aid 26 and reference reflector 44 as a unit is continued along the Y axis to position the image 36 at a second point on the periphery of the reference reflector 44 opposite the first point, in this case, point C. The alignment aid 26 and reference reflector 44 are then moved in an opposite direction along the Y axis half of the distance between points A and C. The image 36 is now centered between points A and C, is completely on reference reflector 44 and is positioned at the adjustment indicator 28.

If desired, more precise alignment of the image 36 to the center of the reference reflector 44 can be achieved. The alignment aid 26 and reference reflector 44 are moved as a unit in a second radial direction perpendicular to the first. For example, along the X axis. The image 36 is positioned to a third point along the periphery of the reference reflector 44, e.g., point B. The alignment aid 26 and reference reflector 44 are then moved as a unit in an opposite direction along the X axis to position the image 36 at the point D. Finally, the alignment aid 26 and reference reflector 44 are moved as a unit to the midpoint between points B and D. The image 36 is now approximately centered on the reference reflector 44 between points A, B, C and D and is positioned at the alignment indicator 28.

After focusing and positioning the image 36 on the alignment indicator 28, the alignment indicator 28 is located at the focal point 24. Additionally, since the alignment indicator 28 is also located at the optical center of curvature 32 of the reference reflector 30, the optical center of curvature 32 is coincident with the focal point 24. Therefore, the reference reflector 30 is properly aligned. Although the above alignment steps have been described in a particular sequence, it is to be understood that the steps may occur in any order or essentially simultaneously.

According to the present invention, the optical center of curvature 32 is positionable to be coincident with the focal point 24 by focusing and positioning the image 36 on the alignment indicator 28. Thus, moving the alignment aid 26 and reference reflector 30 as a unit enables proper alignment of the reference reflector 30 to the element or optical system to be tested, i.e., lens 20. Securing the alignment aid 26 to the reference reflector 30 provides the advantage of positioning the optical center of curvature 32 to the focal point 24 through movement of a single apparatus. Therefore, the complexity and difficulty of moving two separate devices is alleviated.

Thus, it can be appreciated that the present invention provides a means for quickly and easily locating the focal point of an element or optical system to be tested and positioning the optical center of curvature of a reference reflector thereto. Furthermore, the complexity of moving two separate devices is alleviated. Also, the time required to properly align the reference reflector is decreased. Moreover, the present invention reduces the skill and experience required of an optician to obtain proper alignment of the reference reflector.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A reference reflector alignment apparatus comprising:
   a reference reflector having an optical center of curvature;
   an alignment aid secured to said reference reflector;
   an alignment indicator associated with said alignment aid, said alignment indicator being located essentially at said optical center of curvature; and said alignment aid and said reference reflector being movable as a unit to position said optical center of curvature of said reference reflector coincident with a focal point of an object to be tested.

2. The apparatus of claim 1, wherein said alignment aid includes an opening therethrough defining said alignment indicator.

3. The apparatus of claim 2, wherein said alignment indicator further comprises fluorescent material.

4. The apparatus of claim 1, wherein said alignment indicator comprises fluorescent material.

5. The apparatus of claim 4, wherein said fluorescent material reacts to infrared radiation.

6. The apparatus of claim 4, wherein said fluorescent material reacts to ultraviolet radiation.

7. The apparatus of claim 1, wherein said alignment indicator possesses specular characteristics.

8. The apparatus of claim 1, wherein said alignment indicator possesses diffusive characteristics.

9. The apparatus of claim 1, wherein said alignment indicator possesses reflective characteristics.

10. The apparatus of claim 1, wherein said alignment aid includes alignment assisting indicia.

11. The apparatus of claim 10, wherein said alignment assisting indicia include cross hairs.

12. The apparatus of claim 10, wherein said alignment assisting indicia include fluorescent material.

13. An optical system comprising:

at least one optical element;

an interferometer for testing said at least one optical element;

a reference reflector having an optical center of curvature;

an alignment aid including an alignment indicator, said alignment aid being secured to said reference reflector such that said alignment indicator is located essentially at said optical center of curvature of said reference reflector; and said alignment aid and said reference reflector being movable as a unit to position said optical center of curvature coincident with a focal point of said element to be tested.

14. A method of aligning an optical center of curvature of a reference reflector with a focal point of an object or system to be tested comprising the steps of:

providing an alignment aid having an alignment indicator associated therewith;

securing said alignment aid to said reference reflector such that said alignment indicator is located essentially at said optical center of curvature;

causing radiation to strike said object to be tested thereby forming an image; and moving said alignment aid and said reference reflector as a unit to focus and position said image on said alignment indicator.

* * * * *